(12) United States Patent
Xu et al.

(10) Patent No.: US 9,228,067 B2
(45) Date of Patent: Jan. 5, 2016

(54) FLAME-RESISTANT POLYCARBONATE FILM

(75) Inventors: Yuzhen Xu, Shanghai (CN); Liang Wen, Shanghai (CN); Zhe Chen, Shanghai (CN); Yaming Niu, Shanghai (CN); Jean-Francois Morizur, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 666 days.

(21) Appl. No.: 13/618,181

(22) Filed: Sep. 14, 2012

(65) Prior Publication Data

US 2014/0079934 A1    Mar. 20, 2014

(51) Int. Cl.
*C08J 5/18*    (2006.01)
*C08L 69/00*   (2006.01)

(52) U.S. Cl.
CPC .. *C08J 5/18* (2013.01); *C08L 69/00* (2013.01); *C08J 2369/00* (2013.01); *Y10T 156/10* (2015.01)

(58) Field of Classification Search
CPC ......... C08L 69/00; C08J 2369/00; C08J 5/18; Y10T 156/10
USPC ....................................................... 428/212
See application file for complete search history.

(56) References Cited

U.S. PATENT DOCUMENTS

| 7,652,083 | B2 | 1/2010 | Mullen |
| 7,696,297 | B2 | 4/2010 | Schultz et al. |
| 7,709,562 | B2 | 5/2010 | Li et al. |
| 2009/0062439 | A1* | 3/2009 | van de Grampel et al. ... 524/165 |
| 2009/0326116 | A1* | 12/2009 | Cojocariu et al. ............ 524/154 |
| 2010/0075125 | A1 | 3/2010 | Maas et al. |

FOREIGN PATENT DOCUMENTS

| WO | WO2012065039 A1 | 5/2012 |
| WO | WO2012106425 A1 | 8/2012 |

OTHER PUBLICATIONS

International Search Report for International Application No. PCT/US20121059376 mailed Dec. 11, 2013, 4 pages.
Written Opinion for International Application No. PCT/US2012/059376 mailed Dec. 11, 2013, 4 pages.

* cited by examiner

*Primary Examiner* — Aaron Austin
*Assistant Examiner* — Lawrence Ferguson
(74) *Attorney, Agent, or Firm* — Cantor Colburn LLP

(57) ABSTRACT

A polycarbonate film having a thickness of 0.05 mm to 0.25 mm is formed from a thermoplastic composition that includes a first branched polycarbonate that has a peak melt viscosity of at least 7,000 poise when measured using a parallel plate melt rheology test at a heating rate of 10° C./min at a temperature of between 350° C. to 450° C., a second branched polycarbonate, and a perfluoroalkyl sulfonate salt.

32 Claims, No Drawings

FLAME-RESISTANT POLYCARBONATE FILM

BACKGROUND OF THE INVENTION

This disclosure relates to thermoplastic materials, and in particular to films used for applications such as electrical and electronic insulation applications.

Polycarbonates are used in the manufacture of articles and components for a wide range of applications, from automotive parts to electronic appliances. Because of their beneficial properties such as transparency and impact resistance, polycarbonates have been widely used in applications where high flammability resistance is important. In some applications like extruded film used for electrical and electronic insulation applications, flammability resistance must be provided at thickness levels substantially below those utilized for most molded thermoplastic articles, as low as 0.05 millimeters (mm). Other properties such as good folding performance, voltage resistance, and heat resistance are also desirable for such applications. Although many polycarbonate compositions can provide beneficial combinations of the aforementioned properties, many known compositions have not been able to achieve desired levels of flammability resistance with very thin polycarbonate materials. There accordingly remains a need in the art for plastic films that provide beneficial combinations of properties for performance in demanding applications such as electrical insulation applications.

SUMMARY OF THE INVENTION

In an embodiment, the above-described and other deficiencies of the art are addressed by a plastic film having a thickness of 0.05 mm to 0.25 mm, comprising a thermoplastic composition that comprises:

a first polycarbonate derived from a dihydroxy compound and a carbonate source, comprising repeat units according to formula (1)

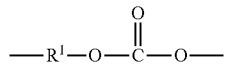

(1)

wherein at least 60 percent of the total number of $R^1$ groups contain aromatic moieties and the balance thereof are aliphatic, alicyclic, or aromatic;

wherein the first polycarbonate further comprises branching groups derived from a first branching agent and end-capping groups derived from an end-capping agent; and wherein the first polycarbonate has a peak melt viscosity of at least 7,000 poise when measured using a parallel plate melt rheology test at a heating rate of 10° C. per minute (° C./min) at a temperature of between 350° C. to 450° C.; a second polycarbonate comprising repeat units according to formula (1)

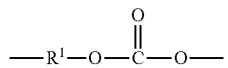

(1)

wherein at least 60 percent of the total number of $R^1$ groups contain aromatic moieties and the balance thereof are aliphatic, alicyclic, or aromatic, and wherein the second polycarbonate further comprises a second branching agent; and a perfluoroalkyl sulfonate salt.

In some embodiments, the end-capping groups of the first polycarbonate comprise cyanophenyl carbonate groups, or the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent.

In some embodiments, the end-capping groups of the first polycarbonate comprise cyanophenyl carbonate groups.

In some embodiments, the first polycarbonate is configured so as to have molecular weight, branching agent content, and end-capping agent such that a calculated peak melt viscosity equals at least 7000 poise according to the equation (1): $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent.

In another embodiment, a method of using the film comprises disposing the film adjacent to an electrical or electronic component or between electrical or electronic components a method of manufacture.

In yet another embodiment, an article comprises an electrical or electronic component and an electrical insulator comprising the film.

DETAILED DESCRIPTION OF THE INVENTION

Surprisingly, it has been discovered that the above-described film formed from a thermoplastic composition that comprises a first polycarbonate that includes a first branching agent and that has a peak melt viscosity of at least 7,000 poise when measured using a parallel plate melt rheology test at a heating rate of 10° C./min at a temperature of between 350° C. to 450° C., a second polycarbonate that includes a second branching agent, and a perfluoroalkyl sulfonate salt, is flame resistant even at thicknesses as low as 0.05 mm.

As used herein, a "polycarbonate", including independently the first polycarbonate and the second polycarbonate, means a polymer having repeating structural carbonate units of formula (1)

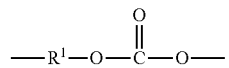

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

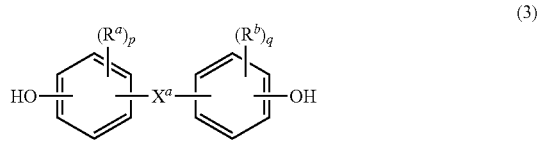

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

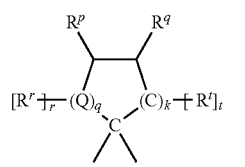

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

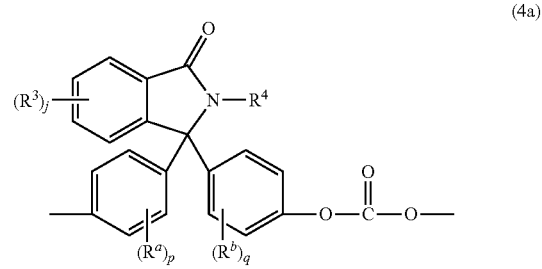

(4a)

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

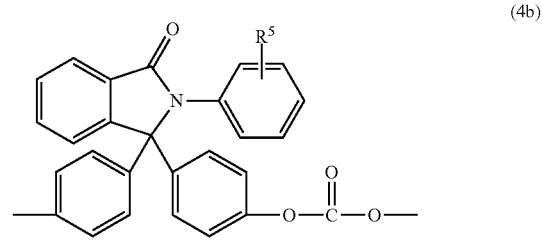

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

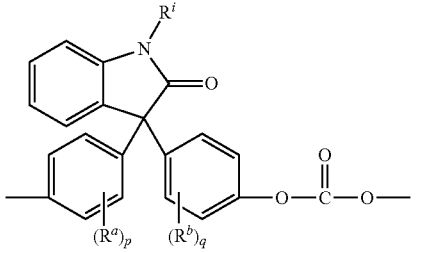
(4c)

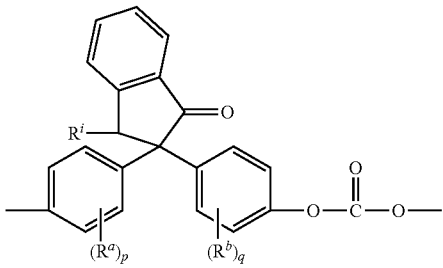
(4d)

wherein $R^a$ and $R^b$ are each independently $C_{1-12}$ alkyl, p and q are each independently 0 to 4, and $R^i$ is $C_{1-12}$ alkyl, phenyl optionally substituted with 1 to 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units derived from bisphenols (4) wherein $X^b$ is a substituted or unsubstituted $C_{3-18}$ cycloalkylidene include the cyclohexylidene-bridged, alkyl-substituted bisphenol of formula (4e)

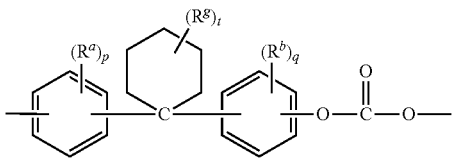
(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0. For example, Examples of other bisphenol carbonate units derived from bisphenol (4) wherein $X^b$ is a substituted or unsubstituted $C_{3-18}$ cycloalkylidene include adamantyl units (4f) and units (4g)

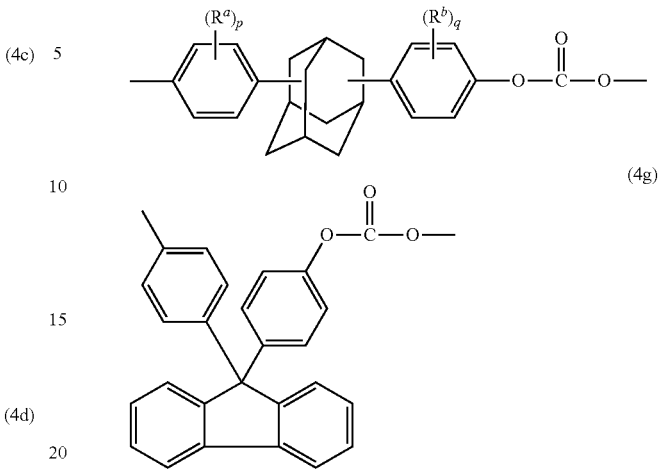
(4f)

(4g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) can be used for making polycarbonates with high glass transition temperatures (Tg) and high heat distortion temperatures.

Other aromatic dihydroxy compounds of the formula HO—$R^1$—OH include compounds of formula (6)

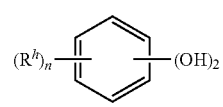
(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Examples of bisphenol compounds of formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

"Polycarbonates" includes homopolycarbonates (wherein each $R^1$ in the polymer is the same), copolymers comprising different R' moieties in the carbonate ("copolycarbonates"), copolymers comprising carbonate units and other types of polymer units, such as ester units, and combinations comprising at least one of homopolycarbonates and/or copolycarbonates.

A type of copolymer is a polyester carbonate, also known as a polyester-polycarbonate. Such copolymers further contain, in addition to recurring carbonate chain units of formula (1), repeating units of formula (7)

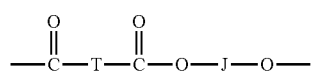
(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

In an embodiment, J is a $C_{2-30}$ alkylene group having a straight chain, branched chain, or cyclic (including polycyclic) structure. In another embodiment, J is derived from an aromatic dihydroxy compound of formula (3) above. In another embodiment, J is derived from an aromatic dihydroxy compound of formula (4) above. In another embodiment, J is derived from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Exemplary dicarboxylic acids include terephthalic acid, isophthalic acid, naphthalene dicarboxylic acid, cyclohexane dicarboxylic acid, or a combination comprising at least one of the foregoing acids. In some embodiments, a dicarboxylic acid comprises a combination of isophthalic acid and terephthalic acid wherein the weight ratio of isophthalic acid to terephthalic acid is 91:9 to 2:98. In some embodiments, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In some embodiments, the polyester unit of a polyester-polycarbonate is derived from the reaction of a combination of isophthalic and terephthalic diacids (or derivatives thereof) with resorcinol. In some embodiments, the polyester unit of a polyester-polycarbonate is derived from the reaction of a combination of isophthalic acid and terephthalic acid with bisphenol A. In some embodiments, the polycarbonate units are derived from bisphenol A. In some embodiments, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. A phase transfer catalyst can be present in an amount of 0.1 to 10 weight percent (wt. %), more specifically 0.5 to 2 wt. % based on the weight of bisphenol in the phosgenation mixture.

Each of the first and second polycarbonates includes branching groups derived from a first branching agent or a second branching agent, respectively. The second branching agent can be the same as or different than the first branching agent. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid, and benzophenone tetracarboxylic acid.

In some embodiments, the branching agent includes a structure derived from a triacid trichloride of the formula (21)

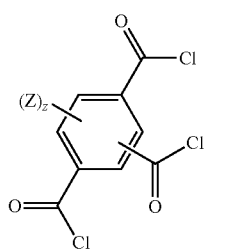

(21)

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (22)

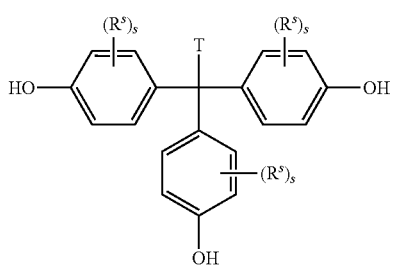

(22)

wherein T is a $C_{1-20}$ alkyl group, $C_{1-20}$ alkyleneoxy group, $C_{7-12}$ arylalkyl, or alkylaryl group, $R^s$ is hydrogen, a halogen, $C_{1-3}$ alkyl group, $C_{1-3}$ alkoxy group, $C_{7-12}$ arylalkyl, alkylaryl, or nitro group, s is 0 to 4.

In some embodiments, the branching agent includes a structure having formula (23)

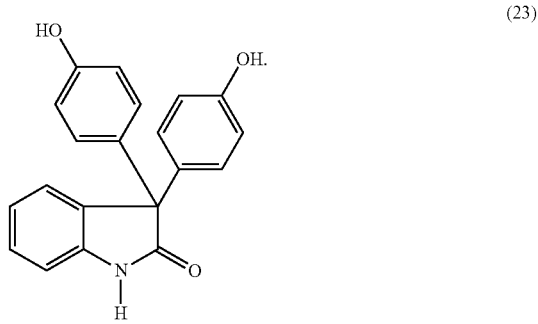 [SMILES: O=C1Nc2ccccc2C1(c1ccc(O)cc1)c1ccc(O)cc1]

(23)

Examples of specific branching agents include trimellitic trichloride (TMTC), tris-p-hydroxy phenyl ethane (THPE) and isatin-bis-phenol. In one embodiment, in formula (21), Z is hydrogen and z is 3. In another embodiment, in formula (22), $R^s$ is hydrogen, T is methyl and s is 4.

The relative amount of branching agents used respectively in each of the first and second polycarbonates will depend on a number of considerations, for example the type of $R^1$ groups, the amount of cyanophenol end-capping agent (if used), and the desired molecular weight of the polycarbonate, with higher levels of cyanophenol, branching agent, and molecular weight each contributing to higher peak viscosity, which allows for the levels of each component to be adjusted to achieve a desired balance of properties. In general, the amount of branching agent is effective to provide 0.1 to 10 branching units per 100 $R^1$ units, specifically 0.5 to 8 branching units per 100 $R^1$ units, and more specifically 0.75 to 5 branching units per 100 $R^1$ units. For branching agents having formula (21), the amount of branching agent tri-ester groups are present in an amount of 0.1 to 10 branching units per 100 $R^1$ units, specifically 0.5 to 8 branching units per 100 $R^1$ units, and more specifically 0.75 to 5 tri-ester units per 100 $R^1$ units. For branching agents having formula (22), the amount of branching agent tricarbonate groups are present in an amount of 0.1 to 10 branching units per 100 $R^1$ units, specifically 0.5 to 8 branching units per 100 $R^1$ units, and more specifically 0.75 to 5 tri-phenylcarbonate units per 100 $R^1$ units. In some embodiments, a combination of two or more branching agents may be used. The above ranges of the number of branching units per 100 $R^1$ units are generally applicable to either the first polycarbonate or the second polycarbonate.

The second polycarbonate is not required to, and in some embodiments does not, achieve any or all of the peak viscosity levels described herein for the first polycarbonate (e.g., 7000 poise, 00 poise, 9000 poise). In some embodiments, the second polycarbonate is free of cyanophenyl endcapping agents and/or is configured so as to have molecular weight, branching agent content, and end-capping agent such that a calculated peak melt viscosity is less than 7000 poise (or <8000 poise or <9000 poise) according to the equation (1): $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$. Also, the quantity of branching units per 100 $R^1$ units can be (but does not necessarily have to be) lower in the second polycarbonate than in the first polycarbonate. For example, in some embodiments the quantity of branching units per 100 $R^1$ units in the first polycarbonate can be 0.1 to 0.7 units higher, more specifically 0.3 to 0.5 units higher than the quantity of branching units per 100 $R^1$ units in the second polycarbonate.

In some embodiments, the first polycarbonate comprises cyanophenyl carbonate end-capping groups. Such end-capping groups can be derived from a cyanophenol endcapping agent (also referred to as a capping or chain stopping agent) during polymerization. Exemplary cyanophenols are of formula (24)

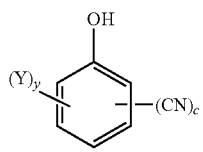
(24)

wherein Y is a halogen, $C_{1-3}$ alkyl group, $C_{1-3}$ alkoxy group, $C_{7-12}$ arylalkyl, $C_{7-12}$ alkylaryl, or nitro group, y is 0 to 4, and c is 1 to 5, provided that y+c is 1 to 5. In one embodiment y is 1 to 2 and c is 1 to 2. In another embodiment, y is 0 and c is 1 to 2. Exemplary cyanophenols include p-cyanophenol and 3,4-dicyanophenol.

The cyanophenols can be added to the polymerization reaction as an endcapping agent using conventionally known processes. It can be beneficial to decrease, minimize, or prevent contact between the cyanophenol and components that result in cyanophenol byproducts, in particular the corresponding carboxylic acids and/or amides. For example, it is common to add endcapping agents as part of a warm aqueous solution of a caustic (i.e., alkali and alkaline earth metal hydroxides such as sodium hydroxide dissolved in water). If such contact occurs, side products can form, such as the corresponding hydroxybenzamide and/or hydroxybenzoic acid. Such side products tend to be insoluble or otherwise incompatible with the interfacial reaction, and can also cause error in obtaining the target molecular weight of the polycarbonate.

It has accordingly been found to modify the reaction conditions employed to produce the endcapped polycarbonates so as to use cyanophenols that are essentially free of acid and amide groups. As used herein, "essentially free of" acid and amide groups means that the total number of acid and amide end groups are less than that detectable by Fourier transform infrared (FT-IR) analysis of the p-cyanophenol prior to addition to the polycarbonate reaction. Addition of the cyanophenol as a component in a warm aqueous solution of caustic is therefore to be avoided.

Other endcapping agents can also be used with phenol containing a cyano substituent, provided that such agents do not significantly adversely affect the desired properties of the compositions, such as transparency, ductility, flame retardance, and the like. In one embodiment only a cyanophenol, specifically p-cyanophenol, is used as an endcapping agent. Exemplary additional chain stoppers include certain other mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used with cyanophenols as chain stopping agents. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations comprising at least one of the foregoing; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms can also be used. Functionalized chlorides of aliphatic monocarboxylic acids, such as acryloyl chloride and methacryoyl chloride can also be used. Other examples include mono-chloroformates including monocyclic, mono-chloroformates, such as phenyl chloroformate, alkyl-substituted phenyl chloroformate, p-cumyl phenyl chloroformate, toluene chloroformate, and combinations comprising at least one of the foregoing.

The relative amount of cyanophenol used in the manufacture of the polymer will depend on a number of considerations, for example the type of $R^1$ groups, the use and amount of the branching agent, and the desired molecular weight of the polycarbonate. In general, the amount of cyanophenol is effective to provide 1 to 20 cyanophenyl carbonate units per 100 $R^1$ units, specifically 2 to 15 cyanophenyl carbonate units per 100 $R^1$ units, and more specifically 3 to 12 cyanophenyl carbonate units per 100 $R^1$ units. Up to half of the cyanophenyl carbonate units can be replaced by a different type of endcapping unit as described above.

In some embodiments, as an alternative to the inclusion of a cyanophenol end-capping agent in the first polymer, the first polycarbonate is configured so as to have molecular weight, branching agent content, and end-capping agent such that a calculated peak melt viscosity will equal at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent.

The above equation (1) provides a general way that has been discovered to design polycarbonates by balancing molecular weight, branching level and end-group type to produce transparent polycarbonate formulations that are easily molded into thin wall articles and pass UL94 testing. This involves measuring the peak melt viscosity of the polycarbonate between 350° C. and 450° C. during a melt rheology test. The "peak melt viscosity" is the highest melt viscosity value (in poise) achieved between 350° C. and 450° C. during rheological testing of a polycarbonate resin.

The equation (1) above allows the design of a wide range of polycarbonate resins. Designing the polycarbonate resins involves selecting an end-capping agent and adjusting the MW of the resin and the branching level of the resin in the manufacturing process so that the calculated or measured peak melt viscosity has a value of 7000 poise or greater, more specifically 8000 poise or greater, and even more specifically 9000 poise or greater. If the pKa of the end-capping agent has a low value (for example methyl-p-hydroxy benzoate with a pKA of 8.) the MW and the amount branching level needed to achieve a UL94 V0 performance can be lower. If the pKa of the end-capping agent is higher (for example p-t-butylphenol with a pKa of 10.3) then the MW and the branching level will need to be higher. Furthermore after the end-capping agent is selected, a choice can be made between balancing the molecular weight with the level of branching agent in the manufacturing process. The balance between the factors can be readily accomplished by one of ordinary skill in the art without undue experimentation.

Without being bound by theory the viscosity behavior of the polycarbonate resin containing said branching agent and said end-capping agent as it passes through the temperature range between 350° C. and 450° C. reflects the beginning of the building up of a polymeric network that impacts the dripping behavior of the resin during UL94 flame testing. Polycarbonate resins that build this network to a higher degree (reflected in a higher peak melt viscosity value in the rheological test) seem to perform better in the UL flame testing at thin walls.

Without being bound by theory, the pKa of the end-capping agent is believed to be of importance in achieving films with a UL94 VTM-0 rating. The pKa of an end-capping agent is a measure of its relative acidity. The lower the pKa value of the end-capping agent the more acidic the end-capping agent. It was unexpectedly observed that the pKa of an end-capping agent is one indicator of the flame retardancy of the branched polycarbonate. For example lower pKas provide better flame retardant properties than higher pKas for branched polycarbonates.

In one embodiment, the end-capping agent has a pKa between 8.3 and 11. In a further embodiment, the end-capping agent has a pKa of between 9 and 11.

In another embodiment, the end-capping agents are selected from at least one of the following: phenol or a phenol containing one or more substitutions with at least one of the following: aliphatic groups, olefinic groups, aromatic groups, halogens, ester groups, and ether groups.

In other embodiments, the end-capping agents are selected from at least one of the following: phenol, para-t-butylphenol or para-cumylphenol.

Without being bound by theory, the BL of the first polycarbonate is believed to be of importance in achieving films with a UL94 VTM-0 rating. It was unexpectedly observed that the BL of the first polycarbonate is one indicator of the flame retardancy. For example, higher BL values provide better flame retardant properties than lower BL values for endcapped polycarbonates.

In some embodiments, BL is at least 0.1, more specifically at least 0.2, and even more specifically BL is at least 0.3. In other embodiments, BL ranges from 0.1 to 7, more specifically from 0.5 to 6, and even more specifically from 0.75 to 5.

The first and second polycarbonates can have a weight average molecular weight of 5,000 to 200,000, specifically 10,000 to 100,000, even more specifically 15,000 to 60,000, still more specifically 25,000 to 35,000 grams per mole (g/mol) as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 milliliters per minute (ml/min) GPC samples are prepared at a concentration of 1 milligrams per milliliter (mg/ml), and are eluted at a flow rate of 1.5 ml/min.

Melt volume flow rate (often abbreviated "MVR") measures the rate of extrusion of a thermoplastic through an orifice at a prescribed temperature and load. A blend containing the first and second polycarbonates can have an MVR, measured at 300° C. under a load of 1.2 kilograms (kg), of 0.1 to 200 cubic centimeters per 10 minutes ($cm^3$/10 min), specifically 1 to 100 $cm^3$/10 min.

Subject to the specific requirements for end-capping agents for the first polycarbonate, all types of polycarbonate end groups are contemplated for polycarbonates in the thermoplastic composition described herein, provided that such end groups do not significantly adversely affect desired properties of the compositions. A chain stopper (also referred to as a capping agent or end-capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and mono-ethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations comprising at least one of the foregoing; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms can be used. Functionalized chlorides of aliphatic monocarboxylic acids, such as acryloyl chloride and methacryoyl chloride, can also be used. Other chain stoppers include mono-chloroformates including monocyclic, mono-chloroformates, such as phenyl chloroformate, alkyl-substituted phenyl chloroformate, p-cumyl phenyl chloroformate, toluene chloroformate, and combinations comprising at least one of the foregoing.

Melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury* mixer, twin screw extruder, or the like to form a uniform dispersion. Volatile monohydric phenol is removed from the molten reactants by distillation and the polymer is isolated as a molten residue. A melt process for making polycarbonates uses a diaryl carbonate ester having electron-withdrawing substituents on the aryls. Examples of diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, transesterification catalysts can include phase transfer catalysts of formula $(R^3)_4Q^+X^-$, wherein each $R^3$, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Polyester-polycarbonates can be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The thermoplastic composition described herein also includes a perfluoroalkyl sulfonate salt. Perfluoroalkyl groups on such compounds can have from 1 to 16 carbon atoms. The perfluoroalkyl sulfonate salt includes cation(s) to balance the charge of the sulfonate. Cations include potassium, ammonium, phosphonium, and other cations as well. Specific examples of perfluoroalkyl sulfonate salts include, but are not limited to, potassium perfluorobutane sulfonate (Rimar salt), potassium perfluoroctane sulfonate, tetraethylammonium perfluorohexane sulfonate. In some embodiments, the perfluoroalkyl sulfonate salt is perfluorobutane sulfonate salt (Rimar salt). The perfluoroalkyl sulfonate salt can be present in the thermoplastic composition in an amount of from 0.01 wt. % to 5 wt. %, more specifically from 0.05 wt. % to 0.10 wt. %, based upon a total weight of the thermoplastic composition.

In addition to the first and second polycarbonates and perfluoroalkyl sulfonate salt, and other components and materials described above, the thermoplastic composition can optionally include other thermoplastic polymers, for example combinations of homopolycarbonates and/or polycarbonate copolymers with polyesters, can be used. Polyesters can include, for example, polyesters having repeating units of formula (7), which include poly(alkylene dicarboxylates), liquid crystalline polyesters, and polyester copolymers. The polyesters described herein are generally completely miscible with the polycarbonates when blended.

Polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Polyesters can include aromatic polyesters, poly(alkylene esters) including poly(alkylene arylates), and poly(cycloalkylene diesters). Aromatic polyesters can have a polyester structure according to formula (7), wherein J and T are each aromatic groups as described hereinabove. Exemplary aromatic polyesters can include poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., 0.5 to 10 weight percent, based on the total weight of the polyester, of units derived from an aliphatic diacid and/or an aliphatic polyol to make copolyesters. Poly(alkylene arylates) can have a polyester structure according to formula (7), wherein T comprises groups derived from aromatic dicarboxylates, cycloaliphatic dicarboxylic acids, or derivatives thereof. Examples of T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), exemplary alkylene groups J include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Other poly(alkylene arylates) include poly(alkylene naphthoates), such as poly(ethylene naphthanoate) (PEN), and poly(butylene naphthanoate) (PBN). A specific poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be used1. Specific ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (9)

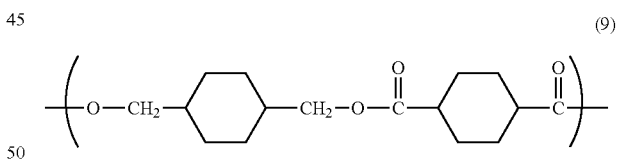

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polycarbonate and polyester can be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of 5 to 150 cubic centimeters per 10 minutes (cc/10 min), specifically 7 to 125 cc/10 min, more specifically 9 to 110 cc/10 min, and still more specifically 10 to 100 cc/10 min, measured at 300° C. and a load of 1.2 kilograms (kg) according to ASTM D1238-04.

The thermoplastic composition can further include impact modifier(s). Impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a glass transition temperature (Tg) less than 10° C., more specifically less than −10° C., or more specifically −40° to −80° C., and (ii) a rigid polymeric superstrate grafted to the elastomeric polymer substrate. Materials for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt. %, based on the total weight of the polymers in the composition.

In addition to the polycarbonates and components described above, the thermoplastic composition can include various additives ordinarily incorporated into polymer compositions of this type, with the proviso that the additive(s) are selected so as to not significantly adversely affect the desired properties of the thermoplastic composition, such as flammability resistance, folding performance, voltage resistance, impact resistance, flow performance, and chemical resistance, heat stability, UV resistance. Such additives can be mixed during the mixing of the components for forming the composition. Additives include impact modifiers, fillers, reinforcing agents, antioxidants, heat stabilizers, light stabilizers including ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. Any combination of additives can be used such as a combination of heat stabilizer(s), UV stabilizer(s), release agent(s), and flame retardant(s). In general, the additives are used in the amounts generally known to be effective. The total amount of additives (other than any impact modifier, filler, or reinforcing agents) is generally 0.01 to 5 wt. %, based on the total weight of the composition.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymeric matrix resin.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers, including ultraviolet light (UV) absorbing additives, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the thermoplastic composition, excluding any filler.

UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene)bis (4H-3,1-benzoxazin-4-one) (CYASORB* UV-3638); 1,3-bis [(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 parts by weight, based on 100 parts by weight of the total composition, excluding any filler.

Radiation stabilizers can also be present, specifically gamma-radiation stabilizers. gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols can also be used, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition, excluding any filler.

The thermoplastic composition disclosed herein can include flame retardants in addition to the above-described perfluoroalkyl sulfonate salt. Notwithstanding that, in some exemplary embodiments described herein, such additional flame retardants are not needed. Therefore, in an exemplary embodiment the flame retardant additives used in the thermoplastic composition consist essentially of the perfluoroalkyl sulfonate salt. In another exemplary embodiment, the flame retardant additives used in the thermoplastic composition consist of the perfluoroalkyl sulfonate salt. If additional flame retardants are used, possible candidates include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds include resorcinol tetraphenyl diphosphate (RDP), the bis(diphenyl) phosphate of hydroquinone and the bis (diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

Flame retardants in addition to the perfluoroalkyl sulfonate salt include, for example salts of $C_{1-16}$ alkyl sulfonate salts such as potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KalF_4$, $K_2SiF_6$, and/or $Na_3AlF_6$. When present, flame retardant salts are present in amounts of 0.01 to 10 parts by weight, more specifically 0.02 to 1 parts by weight, based on 100 parts by weight of the total composition, excluding any filler.

Another flame retardant is a polysiloxane-polycarbonate copolymer having polydiorganosiloxane blocks comprise repeating structural units of formula (9):

(10)

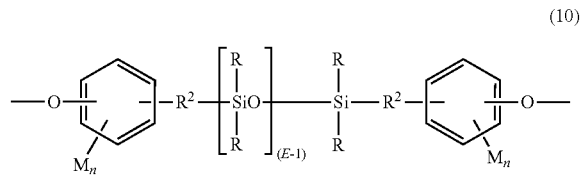

wherein each R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations of the foregoing R groups can be used in the same copolymer. $R^2$ in formula (10) is a divalent $C_1$-$C_8$ aliphatic group. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. Although a polysiloxane-polycarbonate copolymer can be included in the composition in some embodiments, it should be noted that inclusion of a polysiloxane-polycarbonate copolymer can have an adverse impact on the transparency of the article, and therefore the thermoplastic composition can be substantially free of polysiloxane-polycarbonate copolymer.

E in formula (10) is selected so as to provide an effective level of flame retardance to the thermoplastic composition. The value of E will therefore vary depending on the type and relative amount of each component in the thermoplastic composition, including the type and amount of polycarbonate, impact modifier, polysiloxane-polycarbonate copolymer, and other flame retardants. Values for E can be determined by one of ordinary skill in the art without undue experimentation using the guidelines taught herein. Generally, E has an average value of 2 to 1,000, specifically 10 to 100, more specifically 25 to 75. In an embodiment, E has an average value of 40 to 60, and in still another embodiment, E has an average value of 50. Where E is of a lower value, e.g., less than 40, it can be necessary to use a relatively larger amount of the polysiloxane-polycarbonate copolymer. Conversely, where E is of a higher value, e.g., greater than or equal to 40, it can be necessary to use a relatively smaller amount of the polysiloxane-polycarbonate copolymer.

In an embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

The polysiloxane-polycarbonate copolymer can be manufactured by reaction of the corresponding dihydroxy polysiloxane with a carbonate source and a dihydroxy aromatic compound of formula (3), optionally in the presence of a phase transfer catalyst as described above. Conditions are similar to those used in forming polycarbonates. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising 1 to 60 mole percent of polydiorganosiloxane blocks, and more generally, 3 to 50 mole percent of polydiorganosiloxane blocks. When present, the polysiloxane-polycarbonate copolymer can be used in amounts of 5 to 50 parts by weight, more specifically 10 to 40 parts by weight, based on 100 parts by weight of the total parts of resin and impact modifier in the thermoplastic composition.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An exemplary TSAN comprises 50 wt. % PTFE and 50 wt. % SAN, based on the total weight of the encapsulated fluoropolymer. The SAN can also comprise, for example, 75 wt. % styrene and 25 wt. % acrylonitrile, based on the total weight of the encapsulated fluoropolymer. Antidrip agents can be used in amounts of 0.1 to 10 parts by weight, based on 100 parts by weight of the total composition, excluding any filler.

The thermoplastic composition can be essentially free of chlorine and bromine. Essentially free of chlorine and bromine refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm.

In an embodiment, the thermoplastic composition comprises from 5 to 79.999 wt. % of the first polycarbonate, from 94 to 20 wt. % of the second polycarbonate, and from 0.001 to 1 wt. % of the perfluoroalkyl sulfonate salt. In another embodiment, the thermoplastic composition comprises from 5 to 79.999 wt. % of the first polycarbonate, from 94 to 20 wt. % of the second polycarbonate, and from 0.001 to 1 wt. % of the perfluoroalkyl sulfonate salt. In another embodiment, the thermoplastic composition comprises from 5 to 79.999 wt. % of the first polycarbonate, from 94 to 20 wt. % of the second polycarbonate, and from 0.001 to 1 wt. % of the perfluoroalkyl sulfonate salt. All of the foregoing wt. % values are based on the combined weight of the first polycarbonate, the second polycarbonate, and the perfluoroalkyl sulfonate salt.

The thermoplastic compositions can be manufactured by various methods. For example, powdered polycarbonate and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Transparent compositions can be produced by manipulation of the process used to manufacture the polycarbonate composition. One example of such a process to produce transparent polycarbonate compositions is described in U.S. Patent Application No. 2003/0032725.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several flammability ratings can be applied to thin films: VTM-0, VTM-1, and VTM-2. According to this procedure, thin film materials can be classified as VTM-0, VTM-1, and VTM-2. In some embodiments, the thermoplastic composition achieves a UL94 VTM-0 classification when tested as a test sample having a thickness of 0.05 mm.

The thermoplastic compositions described herein can be formed into thin films by extrusion, roll coating, blade coating. Film thickness can vary depending on the application. Exemplary film thickness can be from 0.02 mm to 0.8 mm, more specifically from 0.02 mm to 0.5 mm, and even more specifically from 0.05 mm to 0.25 mm. In an exemplary application, the films can be used as electrically insulating films on printed circuit boards, including flexible printed circuit boards and battery insulation.

Examples of Embodiments

In an embodiment, plastic film having a thickness of 0.05 mm to 0.25 mm comprises a thermoplastic composition that comprises
a first polycarbonate derived from a dihydroxy compound and a carbonate source, comprising repeat units according to formula (1)

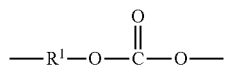

(1)

wherein at least 60 percent of the total number of $R^1$ groups contain aromatic moieties and the balance thereof are aliphatic, alicyclic, or aromatic;

wherein the first polycarbonate further comprises branching groups derived from a first branching agent and end-capping groups derived from an end-capping agent; and wherein the first polycarbonate has a peak melt viscosity of at least 7,000 poise when measured using a parallel plate melt rheology test at a heating rate of 10° C./min at a temperature of between 350° C. to 450° C.;

a second polycarbonate comprising repeat units according to formula (1)

(1)

wherein at least 60 percent of the total number of $R^1$ groups contain aromatic moieties and the balance thereof are aliphatic, alicyclic, or aromatic, and wherein the second polycarbonate further comprises a second branching agent; and a perfluoroalkyl sulfonate salt.

In the various embodiments, (i) the end-capping groups of the first polycarbonate comprise cyanophenyl carbonate groups, or wherein the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of groups in the first polycarbonate, and "pKa" is the pKa of the end-capping agent, or wherein the end-capping groups of the first polycarbonate comprise cyanophenyl carbonate groups and the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$; and/or (ii) the end-capping groups of the first polycarbonate comprise cyanophenyl carbonate endcapping groups; and/or (iii) the cyanophenyl carbonate endcapping groups are present in an amount of 2 to 20 cyanophenyl carbonate units per 100 $R^1$ units in the first polycarbonate; and/or (iv) the cyanophenol carbonate endcapping groups are derived from a cyanophenol of the formula

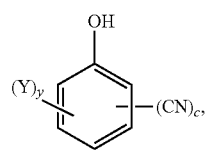

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5; and/or (v) the cyanophenol carbonate endcapping groups are derived from p-cyanophenol, 3,4-dicyanophenol, or a combination comprising at least one of the foregoing phenols; and/or (vi)

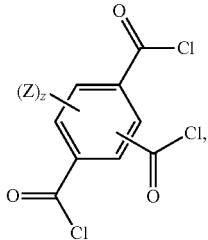

the first branching agent comprises a triacid trichloride of the formula wherein Z is a halogen, $C_{1-3}$ alkyl group, $C_{1-3}$ alkoxy group, $C_{7-12}$ arylalkyl, alkylaryl, or nitro group, and z is 0 to 3, a tri-substituted phenol of the formula

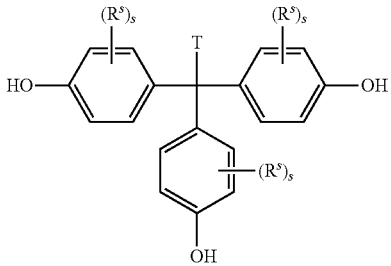

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4, or a structure of the formula

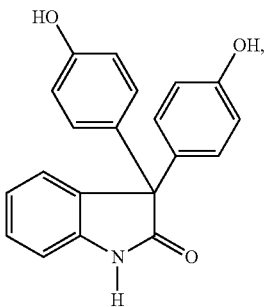 [SMILES: O=C1Nc2ccccc2C1(c1ccc(O)cc1)c1ccc(O)cc1]

or a combination of comprising one or more of the above; and/or (vii) the first branching agent comprises a tri-substituted phenol of the formula

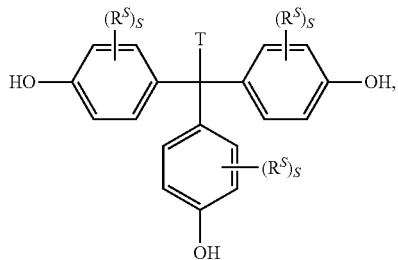

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4; and/or (viii) the first branching agent comprises a triacid trichloride of the formula

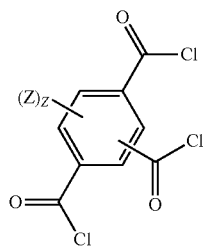

wherein Z is a halogen, $C_{1-3}$ alkyl group, $C_{1-3}$ alkoxy group, $C_{7-12}$ arylalkyl, alkylaryl, or nitro group, and z is 0 to 3; and/or (ix) the first branching agent comprises tris-hydroxyphenyl ethane or trimellitic trichloride or a combination of least one of the foregoing groups; and/or (x) the branching groups of the first polycarbonate are present in an amount of from 0.75 to 5 branching groups per 100 $R^1$ units of the first polycarbonate; and/or (xi) the first polycarbonate is configured so as to have molecular weight, branching agent content, and endcapping agent such that a calculated peak melt viscosity equals at least 7000 poise according to the equation: $-57135.91+36961.39*BL+14001.13*MW^{1/3}-46944.24*pKa-322.51*BL*MW^{2/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent; and/or (xii) the end-capping agent has a pKa of 8.3 to 11; and/or (xiii) the end-capping agent has a pKa of 8.3 to 10.2; and/or (xiv) the end-capping agent comprises phenol or a phenol containing one or more substitutions comprising aliphatic groups, olefinic groups, aromatic groups, halogens, ester groups, ether groups, or halogens, or combinations comprising at least one of the foregoing; and/or (xv) the end-capping agent comprises phenol, p-t-butylphenol, p-cumylphenol, or combinations comprising at least one of the foregoing; and/or (xvi) BL is greater than or equal to 0.01; and/or (xvii) BL is greater than or equal to 0.02; and/or (xviii) BL is greater than or equal to 0.03; and/or (xix) the first branching agent comprises THPE, TMTC, isatin-bis-phenol, or combinations comprising at least one of the foregoing; and/or (xx) the film comprises from 5 to 79.999 wt. % of the first polycarbonate, from 94 to 20 wt. % of the second polycarbonate, and from 0.001 to 1 wt. % of the perfluoroalkyl sulfonate salt; and/or (xxi) the second polycarbonate has a peak melt viscosity of less than 7,000 poise when measured using a parallel plate melt rheology test at a heating rate of 10° C./min at a temperature of between 350° C. to 450° C.; and/or (xxii) the perfluoroalkyl sulfonate salt is potassium perfluorobutane sulfonate (Rimar salt), potassium perfluoroctane sulfonate, tetraethylammonium perfluorohexane sulfonate, or a combination comprising any of the foregoing; and/or (xxiii) the thermoplastic composition achieves a UL94 VTM-0 classification when tested as a test sample having a thickness of 0.05 mm; and/or (xxiv) the thermoplastic composition is substantially free of bromine and chlorine; and/or (xxv) the first and second polycarbonates are substantially free of bromine and chlorine; and/or (xxvi) a method of using the film of any of the above embodiments alone or in combination comprises disposing the film adjacent to an electrical or electronic component or between electrical or electronic components; and/or (xxvii) an article comprises an electrical or electronic component and an electrical insulator comprising the film of any of the above embodiments alone or in combination; and/or (xxviii) a printed circuit board or a battery comprises an electrical or electronic component and an electrical insulator comprising the film of any of the above embodiments alone or in combination; and/or (xxix) a flexible printed circuit board comprises an electrical or electronic component and an electrical insulator comprising the film of any of the above embodiments alone or in combination The thermoplastic compositions are further illustrated by the following non-limiting examples.

EXAMPLES

The following components are used in the examples. Unless specifically indicated otherwise, the amount of each component is in weight percent in the following examples, based on the total weight of the composition.

| Acronym | Component |
|---------|-----------|
| PC-100 | p-Cumylphenyl carbonate endcapped BPA polycarbonate having a MW of 30,000 g/mole made by a melt process with an MVR at 300° C./1.2 kg, of 5.1-6.9 g/cm³ |
| PC-130 | p-Cumylphenyl carbonate endcapped BPA polycarbonate (Mw = 36,500 g/mol) |
| PC-1A | BPA polycarbonate having a MW of 30,000 g/mole and containing 3 mole % THPE branching agent, and 8.5 mole % of p-cyanophenol end-capping agent, based on the total moles of BPA, THPE, and end-capping agent |
| PC-1B | BPA polycarbonate having a MW of 30,000 and containing 3 mole % THPE branching agent, and 0.8 mole % of phenol end-capping agent based on the total moles of BPA, THPE, and end-capping agent, and having a peak melt viscosity of at least 7,000 poise when measured using a parallel plate melt rheology test at a heating rate of 10° C./min at a temperature of between 350° C. to 450° C. |
| PC-2 | BPA polycarbonate containing 0.0045 moles THPE branching agent per mole BPA |
| FR | potassium perfluorobutane sulfonate |
| PETS | pentaerythritol tetrastearate |
| PAO | poly(alpha-olefin), CAS# 68037-01-4, a kind of mold release |

All thermoplastic compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on a Husky or BOY injection-molding machine. Compositions are compounded and molded at a temperature of 285 to 330° C., though it will be recognized by one skilled in the art that the method cannot be limited to these temperatures.

Physical measurements were made using the tests and test methods described above.

Examples 1-10

The ingredients set forth in Table 1 were compounded and blended, and extruded as films at thicknesses of 0.05 mm, 0.075 mm, 0.1 mm. The films were subjected to UL94 flammability testing at VTM standards for thin films using the procedures set forth above. The results, set forth in Table 1, demonstrate that the films of the invention achieved a UL94 flame resistance rating of VTM-0 at each thickness.

TABLE 1

| UL94 Performance | Ingredient | 1 | 2 | 3 | 4 | 5 | 6 | 7 | 8 | 9 | 10 |
|---|---|---|---|---|---|---|---|---|---|---|---|
| | PC-1A | 30 | | 30 | 25 | | 25 | | 20 | 20 | 25 |
| | PC-1B | | 30 | | | 25 | | 20 | | | |
| | PC-2 | 70 | 70 | 70 | 75 | 75 | 75 | 80 | 80 | 80 | 85 |
| | Phosphite Stabilizer | 0.06 | 0.06 | 0.06 | 0.06 | 0.06 | 0.06 | 0.06 | 0.06 | 0.06 | 0.06 |
| | Carbon Black | | 0.3 | 0.3 | | 0.3 | 0.3 | | 0.3 | | |
| | FR | 0.52 | 0.52 | 0.52 | 0.3 | 0.3 | 0.3 | 0.1 | 0.1 | 0.52 | 0.52 |
| UL94 FR VTM Rating at 0.05 mm | | VTM0 | VTM0 | VTM0 | VTM0 | VTM0 | VTM0 | VTM0 | VTM0 | VTM0 | VTM0 |
| UL94 FR VTM Rating at 0.075 mm | | VTM0 | VTM0 | VTM0 | VTM0 | VTM0 | VTM0 | VTM0 | VTM0 | VTM0 | VTM0 |
| UL94 FR VTM Rating at 0.1 mm | | VTM0 | VTM0 | VTM0 | VTM0 | VTM0 | VTM0 | VTM0 | VTM0 | VTM0 | VTM0 |

Examples 11-19

The ingredients set forth in Table 2 were compounded and blended, and extruded as films at thicknesses of 0.05 mm, 0.075 mm, 0.1 mm. The films were subjected to UL94 flammability testing at VTM standards for thin films using the procedures set forth above. The results, set forth in Table 2, demonstrate that the films of the invention achieved a UL94 flame resistance rating of VTM-0 at each thickness.

TABLE 2

| UL94 Performance | Ingredient | 11 | 12 | 13 | 14 | 15 | 16 | 17 | 18 | 19 |
|---|---|---|---|---|---|---|---|---|---|---|
| | PC-1A | 30 | | 50 | | | 50 | | | 30 |
| | PC-1B | | 50 | | 40 | 30 | | 30 | 50 | |
| | PC-2 | 70 | 50 | 50 | 60 | 70 | 50 | 70 | 50 | 70 |
| | Polymethylphenyl siloxane | | 0.4 | 0.4 | 0.2 | | | 0.4 | | 0.4 |
| | Phosphite Stabilizer | 0.06 | 0.06 | 0.06 | 0.06 | 0.06 | 0.06 | 0.06 | 0.06 | 0.06 |
| | Carbon Black | | 0.3 | 0.3 | | 0.3 | 0.3 | | 0.3 | |
| | FR | 0.52 | 0.52 | 0.52 | 0.3 | 0.3 | 0.3 | 0.1 | 0.1 | 0.52 |
| UL94 FR VTM Rating at 0.05 mm | | VTM0 | VTM0 | VTM0 | VTM0 | VTM0 | VTM0 | VTM0 | VTM0 | VTM0 |
| UL94 FR VTM Rating at 0.075 mm | | VTM0 | VTM0 | VTM0 | VTM0 | VTM0 | VTM0 | VTM0 | VTM0 | VTM0 |
| UL94 FR VTM Rating at 0.1 mm | | VTM0 | VTM0 | VTM0 | VTM0 | VTM0 | VTM0 | VTM0 | VTM0 | VTM0 |

Comparative Examples 1-6

The ingredients set forth in Table 3 were compounded and blended, and extruded as films at thicknesses of 0.05 mm, 0.075 mm, 0.1 mm. The films were subjected to UL94 flammability testing at VTM standards for thin films using the procedures set forth above. The results, set forth in Table 3, demonstrate that the comparison films failed to achieve the UL94 flame resistance achieved by films of the invention, even with substantially higher amounts of flame retardant.

TABLE 3

| Performance | Ingredient | C1 | C2 | C3 | C4 | C5 | C6 |
|---|---|---|---|---|---|---|---|
| | PC-100 | 70 | 70 | 70 | 40 | 40 | 40 |
| | PC-2 | 30 | 30 | 30 | 60 | 60 | 60 |
| | Phosphite Stabilizer | 0.06 | 0.06 | 0.06 | 0.06 | 0.06 | 0.06 |
| | FR | 0.5 | 0.75 | 1 | 0.5 | 0.75 | 1 |
| MVR (g/10 min.) at 300° C. and 1.2 kg | | 4.38 | 4.4 | 4.44 | 2.78 | 2.83 | 2.77 |
| UL94 FR VTM Rating at 0.05 mm | | Fail | Fail | VTM2 | VTM2 | Fail | Fail |
| UL94 FR VTM Rating at 0.075 mm | | VTM2 | VTM2 | VTM2 | VTM2 | VTM2 | VTM2 |
| UL94 FR VTM Rating at 0.1 mm | | VTM2 | VTM2 | VTM2 | VTM2 | VTM2 | VTM2 |

Comparative Examples 7-16

The ingredients set forth in Table 4 were compounded and blended, and extruded as films at thicknesses of 0.05 mm, 0.075 mm, 0.1 mm. The films were subjected to UL94 flammability testing at VTM standards for thin films using the procedures set forth above. The results, set forth in Table 4, demonstrate that the comparative films, even the comparative examples containing the branched polycarbonate PC-2, provided inferior flame resistance to the films of the invention.

TABLE 4

| UL94 Performance | Ingredient | C7 | C8 | C9 | C10 | C11 | C12 | C13 | C14 | C15 | C16 |
|---|---|---|---|---|---|---|---|---|---|---|---|
| | PC-100 | 85 | 85 | 85 | 90 | 40 | 90 | 40 | 70 | 90 | 40 |
| | PC-130 | 15 | 15 | 15 | | | | | | | |
| | PC-2 | | | | 10 | 60 | 10 | 60 | 30 | 10 | 60 |
| | Phosphite Stabilizer | 0.06 | 0.06 | 0.06 | 0.06 | 0.06 | 0.06 | 0.06 | 0.06 | 0.06 | 0.06 |

TABLE 4-continued

| UL94 Performance | Ingredient | C7 | C8 | C9 | C10 | C11 | C12 | C13 | C14 | C15 | C16 |
|---|---|---|---|---|---|---|---|---|---|---|---|
| | PETS | | 0.1 | 0.1 | 0.1 | 0.1 | 0.1 | 0.1 | 0.1 | | |
| | PAO | | 0.2 | 0.4 | 0.2 | 0.2 | 0.4 | 0.4 | 0.3 | | |
| | FR | 0.52 | 0.52 | 0.52 | 0.3 | 0.3 | 0.3 | 0.1 | 0.1 | 0.52 | 0.52 |
| UL94 FR VTM Rating at 0.05 mm | | Fail | Fail | Fail | Fail | Fail | VTM2 | VTM2 | VTM2 | VTM2 | VTM2 |
| UL94 FR VTM Rating at 0.075 mm | | VTM2 | VTM2 | VTM2 | VTM2 | VTM2 | VTM2 | VTM1 | VTM2 | VTM2 | VTM2 |
| UL94 FR VTM Rating at 0.1 mm | | VTM2 | VTM2 | VTM2 | VTM2 | VTM2 | VTM2 | VTM2 | VTM2 | VTM2 | VTM0 |

The singular forms "a," "an," and "the" include plural referents unless the context clearly dictates otherwise. "Or" means "and/or". The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt. %, or 5 wt. % to 20 wt. %," is inclusive of the endpoints and all intermediate values of the ranges of "5 wt. % to 25 wt. %," etc.). The suffix "(s)" is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A plastic film having a thickness of 0.05 mm to 0.25 mm, comprising a thermoplastic composition that comprises:
a first polycarbonate derived from a dihydroxy compound and a carbonate source, comprising repeat units according to formula (1)

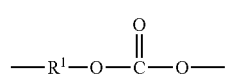

wherein at least 60 percent of the total number of $R^1$ groups contain aromatic moieties and the balance thereof are aliphatic, alicyclic, or aromatic;

wherein the first polycarbonate further comprises branching groups derived from a first branching agent and end-capping groups derived from an end-capping agent; and wherein the first polycarbonate has a peak melt viscosity of at least 7,000 poise when measured using a parallel plate melt rheology test at a heating rate of 10° C./min at a temperature of between 350° C. to 450° C.; and a second polycarbonate comprising repeat units according to formula (1)

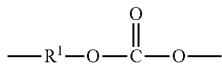
(1)

wherein at least 60 percent of the total number of $R^1$ groups contain aromatic moieties and the balance thereof are aliphatic, alicyclic, or aromatic, and wherein the second polycarbonate further comprises a second branching agent; and a perfluoroalkyl sulfonate salt;

wherein the end-capping groups of the first polycarbonate comprise cyanophenyl carbonate groups, or wherein the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent, or wherein the end-capping groups of the first polycarbonate comprise cyanophenyl carbonate groups and the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$.

2. The film of claim 1, wherein said end-capping groups of the first polycarbonate comprise cyanophenyl carbonate endcapping groups.

3. The film of claim 2, wherein the cyanophenyl carbonate endcapping groups are present in an amount of 2 to 20 cyanophenyl carbonate units per 100 $R^1$ units in the first polycarbonate.

4. The film of claim 2, wherein the cyanophenol carbonate endcapping groups are derived from a cyanophenol of the formula

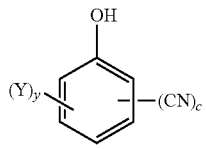

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5.

5. The film of claim 2, wherein the cyanophenol carbonate endcapping groups are derived from p-cyanophenol, 3,4-dicyanophenol, or a combination comprising at least one of the foregoing phenols.

6. The film of claim 2, wherein the first branching agent comprises tris-hydroxyphenyl ethane or trimellitic trichloride or a combination of least one of the foregoing groups.

7. The film of claim 2, wherein the branching groups of the first polycarbonate are present in an amount of from 0.75 to 5 branching groups per 100 $R^1$ units of the first polycarbonate.

8. The film of claim 2, wherein the first branching agent comprises:

a triacid trichloride of the formula

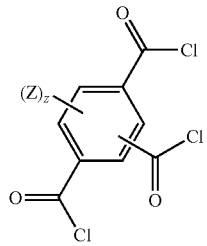

wherein Z is a halogen, $C_{1-3}$ alkyl group, $C_{1-3}$ alkoxy group, $C_{7-12}$ arylalkyl, alkylaryl, or nitro group, and z is 0 to 3;

a tri-substituted phenol of the formula

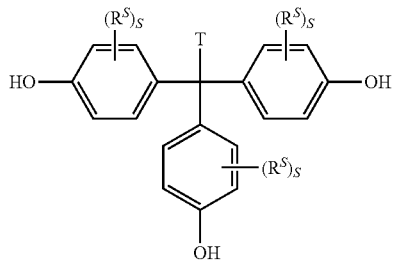

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4; or a structure of the formula

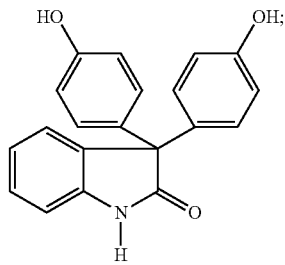

or a combination of comprising one or more of the above.

9. The film of claim 8, wherein the first branching agent comprises a tri-substituted phenol of the formula

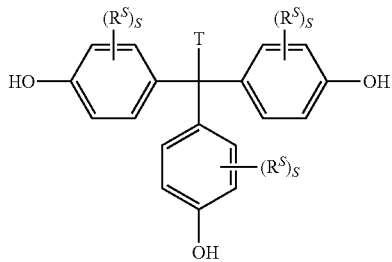

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4.

10. The film of claim 8, wherein the first branching agent comprises a triacid trichloride of the formula:

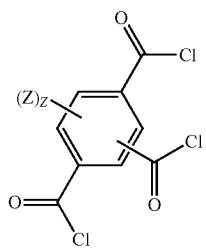

wherein Z is a halogen, $C_{1-3}$ alkyl group, $C_{1-3}$ alkoxy group, $C_{7-12}$ arylalkyl, alkylaryl, or nitro group, and z is 0 to 3.

11. The film of claim 1, wherein the first polycarbonate is configured so as to have molecular weight, branching agent content, and end-capping agent such that a calculated peak melt viscosity equals at least 7000 poise according to the equation: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein "MW" is the weight-averaged molecular weight as determined by gel permeation chromatography using polycarbonate standards, "BL" (branching level) is defined as the ratio of number of moles of first branching groups divided by the number of moles of $R^1$ groups in the first polycarbonate, and "pKa" is the pKa of the end-capping agent.

12. The film of claim 11, wherein the end-capping agent has a pKa of 8.3 to 11.

13. The film of claim 11, wherein the end-capping agent has a pKa of 8.3 to 10.2.

14. The film of claim 11, wherein the end-capping agent comprises phenol or a phenol containing one or more substitutions comprising aliphatic groups, olefinic groups, aromatic groups, halogens, ester groups, ether groups, or halogens, or a combination comprising at least one of the foregoing.

15. The film of claim 11, wherein the end-capping agent comprises phenol, p-t-butylphenol, p-cumylphenol, or a combination comprising at least one of the foregoing.

16. The film of claim 11, wherein BL is greater than or equal to 0.01.

17. The film of claim 11, wherein BL is greater than or equal to 0.02.

18. The film of claim 11, wherein BL is greater than or equal to 0.03.

19. The film of claim 11, wherein the first branching agent comprises THPE, TMTC, isatin-bis-phenol, or a combination comprising at least one of the foregoing.

20. The film of claim 1, comprising from 5 to 79.999 wt. % of the first polycarbonate, from 94 to 20 wt. % of the second polycarbonate, and from 0.001 to 1 wt. % of the perfluoroalkyl sulfonate salt.

21. The film of claim 1, wherein the second polycarbonate has a peak melt viscosity of less than 7,000 poise when measured using a parallel plate melt rheology test at a heating rate of 10° C/min at a temperature of between 350° C. to 450° C.

22. The film of claim 1, wherein the perfluoroalkyl sulfonate salt is potassium perfluorobutane sulfonate (Rimar salt), potassium perfluoroctane sulfonate, tetraethylammonium perfluorohexane sulfonate, or a combination comprising any of the foregoing.

23. The film of claim 1, wherein the thermoplastic composition achieves a UL94 VTM-0 classification when tested as a test sample having a thickness of 0.05 mm.

24. The film of claim 1, wherein the thermoplastic composition is substantially free of bromine and chlorine.

25. The film of claim 1, wherein the first and second polycarbonates are substantially free of bromine and chlorine.

26. The film of claim 1, wherein the first branching agent comprises:

a triacid trichloride of the formula

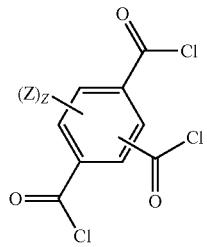

wherein Z is a halogen, $C_{1-3}$ alkyl group, $C_{1-3}$ alkoxy group, $C_{7-12}$ arylalkyl, alkylaryl, or nitro group, and z is 0 to 3;

a tri-substituted phenol of the formula

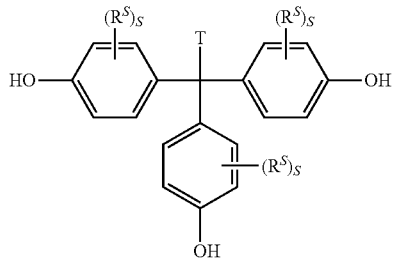

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4; or a structure of the formula

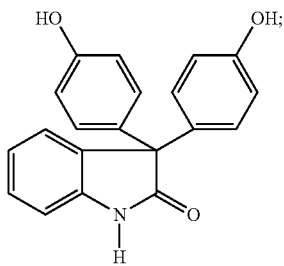 [SMILES: O=C1Nc2ccccc2C1(c1ccc(O)cc1)c1ccc(O)cc1]

or a combination of comprising one or more of the above structures.

27. The film of claim 26, wherein the first branching agent comprises a tri-substituted phenol of the formula

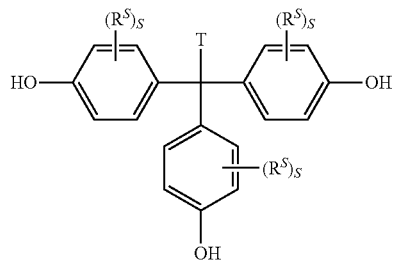

wherein T is a $C_{1-20}$ alkyl group, $C_{1-20}$ alkyleneoxy group, $C_{7-12}$ arylalkyl, or alkylaryl group, $R^s$ is a halogen, $C_{1-3}$ alkyl group, $C_{1-3}$ alkoxy group, $C_{7-12}$ arylalkyl, alkylaryl, or nitro group, and s is 0 to 4.

28. The film of claim 26, wherein the first branching agent comprises a triacid trichloride of the formula

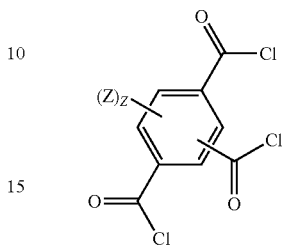

wherein Z is a halogen, $C_{1-3}$ alkyl group, $C_{1-3}$ alkoxy group, $C_{7-12}$ arylalkyl, alkylaryl, or nitro group, and z is 0 to 3.

29. A method of using the film of claim 1, comprising disposing the film adjacent to an electrical or electronic component or between electrical or electronic components.

30. An article comprising an electrical or electronic component and an electrical insulator comprising the film of claim 1.

31. The article of claim 30, which is a printed circuit board or battery.

32. The article of claim 31, wherein the article is a flexible printed circuit board.

* * * * *